Feb. 21, 1961 R. C. BAUBLES 2,972,275
RESILIENT SPLIT PIN WITH INWARDLY EXTENDING PORTION
Filed Feb. 27, 1958

INVENTOR
RICHARD C. BAUBLES
Richard M. Craig
ATTORNEY

# 2,972,275

RESILIENT SPLIT PIN WITH INWARDLY EXTENDING PORTION

Richard C. Baubles, West Orange, N.J., assignor to Elastic Stop Nut Corporation of America, Union, N.J., a corporation of New Jersey Filed Feb. 27, 1958, Ser. No. 717,998

1 Claim. (Cl. 85—8.3)

This invention relates to fastening devices and more particularly to resilient spring pins of sheet material.

A pin embodying the invention may be deemed an improvement over a prior art pin comprising a tube of resilient sheet material having beveled ends and outer and inner cylindrical surfaces having confronting edges which are normally spaced apart to provide a gap extending the entire length of the pin, the confronting edges lying in planes substantially including the pin axis. The normal outside diameter of this prior art pin is slightly greater than the diameter of a hole into which the pin is driven. Therefore, during driving the wall of the hole compresses the pin radially to decrease the gap width and to set up reaction force in the pin bearing against the hole wall, thus frictionally to retain the pin in the hole.

The prior art pin described above has been widely accepted, but in certain cases it is subject to undesirable dimensional limitations. For example, for strength reasons it is desirable that the gap width be as small as possible after installation, when ideally the confronting edges should just barely butt each other. However, for practical reasons, the normal outside pin diameter and the diameter of the hole into which the pin is to be driven must have reasonable tolerances; therefore, both the normal and the installed gap width will vary, and the normal gap width of the prior art pin can not be less than a predetermined minimum, without having the pin edges subject to butting and giving rise to excessive insertion pressures or making insertion impossible.

At the same time, to avoid pin nesting it is desirable that the normal gap width be less than the wall thickness of the pins.

Thus, there are reasons why the gap of a prior art pin should be fairly wide and also why the gap should be as narrow as possible. In some cases, particularly where the pin wall thickness is small, it is impossible to make a prior art pin which avoids the nesting problem without being subject to butting of the pin edges during installation.

Important objects of this invention are to provide a pin which overcomes the above-outlined dimensional limitations of the prior art pin.

Additionally, the prior art pin requires the use of a special tool for driving the pin out of the hole.

It is another object of this invention to provide a pin which can be removed from a hole it is in without special tools, as by an ordinary nail.

Broadly, a pin embodying the invention comprises a tube of resilient material defining a pin axis and having a body portion of uniform wall thickness and outer and inner surfaces and including a cylindrical part of C-shaped in sections perpendicular to the pin axis, the body portion having a longitudinal edge joining the outer and inner surfaces and terminating the cylindrical part, the body portion having an additional part also terminating the cylindrical part circumferentially remote from its location of merger with the cylindrical part to a location closer to the pin axis than the edge, the outer surface in the additional part blending smoothly with the outer surface in the cylindrical part and confronting and normally spaced from the edge to define therewith a longitudinal gap the width of which is less than the wall thickness.

The above and other objects and advantages will appear from the following description of examples of the invention and the accompanying drawings thereof in which.

Figure 1:
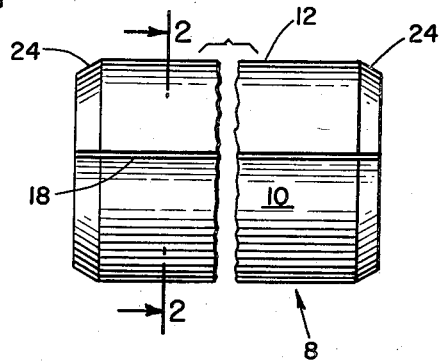
Fig. 1 is an elevation of a pin embodying the invention.
Figure 2:
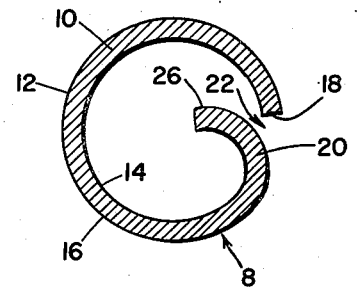
Fig. 2 is a sectional view on line 2—2 of Fig. 1.

Reference is first made to the example of the invention shown in Figs. 1 and 2 which disclose a one-piece spring pin 8 comprising a tube of resilient sheet material such as alloy steel or copper beryllium and having a body portion 10 of uniform wall thickness and outer and inner surfaces 12 and 14, respectively. Body portion 10 includes a cylindrical part 16, which, in sections perpendicular to the pin axis (Fig. 2), is C-shaped. Body portion 10 has a longitudinal edge 18 joining outer and inner surfaces 12 and 14 and terminating cylindrical part 16. As shown, cylindrical part 16 is of approximately 315 degrees in circumferential extent, and edge 18 defines a plane surface substantially including the pin axis.

The angular circumferential extent of cylindrical part 16 may vary but for best results should be more than about 270 degrees. In any event it will be less than 360 degrees.

Body portion 10 further has an additional part 20 which also terminates cylindrical part 16 circumferentially remote from edge 18 and extending from its location of merger with cylindrical part 16 to a location closer to the pin axis than inner surface 14 at edge 18. Outer surface 12 in additional part 20 blends smoothly with outer surface 12 in cylindrical part 16 and in additional part 20 confronts and is normally spaced from inner surface 14 at edge 18 to define therewith a longitudinal gap 22 the width of which is less than the wall thickness of body portion 10.

Thus, it is impossible for edge 18 of one pin 8 to enter gap 22 of an identical pin 8, so that there can be no pin nesting.

Also as shown, the ends of pin 8 are provided with externally beveled portions 24 integral with body portion 12 to facilitate insertion of pin 8 in a cylindrical hole in other structure, the diameter of such cylindrical hole being slightly less than the normal diameter of outer surface 12 in cylindrical part 16 of pin 8.

To install pin 8 in the cylindrical hole, pin 8 is simply aligned therewith with one of beveled portions 24 engaging an end of the hole and driving force is applied to the other beveled portion 24. During installation, pin 8 is compressed radially and during this compression the width of gap 22 is reduced.

Under certain conditions, as where the normal (or original) width of gap 22 is on the low side of the tolerance therefor and the normal (or original) diameter of outer surface 12 in cylindrical part 16 is on the high side of the tolerance therefor and the diameter of the cylindrical hole is on the low side of the tolerance therefor, the width of gap 22 may be reduced to zero during installation. Should this occur, outer surface 12 in additional part 20 will engage edge 18 at inner surface 14 and further radial compression of pin 8 will result, not in a build-up of insertion pressure beyond the acceptable limit, but rather in an inward sliding of surface 12 in additional part 20 along edge 18 at surface 14.

Thus, even where the wall thickness of pin 8 is relatively quite small both pin nesting and build-up of excessive insertion pressure are eliminated.

As shown, additional part 20 is cylindrical, defining an additional axis parallel to the pin axis and between the pin axis and the location of merger of parts 16 and 20.

Body portion 10 advantageously has a further part 26 merging with additional part 20 and extending therefrom generally toward the pin axis, thus to permit pin 8 to be driven from the cylindrical hole by means of a pointed driving instrument such as a common nail. Further part 26 thus prevents the nail from wedging inside pin 8 against surface 14 thereby to increase the frictional engagement of surface 12 with the wall of the hole. Part 26 also facilitates pin removal in the event that a punch is used, especially where the wall thickness is relatively quite small. Otherwise quite precise dimensional control of the punch would be required. As shown further part 26 is cylindrical and is a continuation of and has the same axis as part 20.

Figure 3:
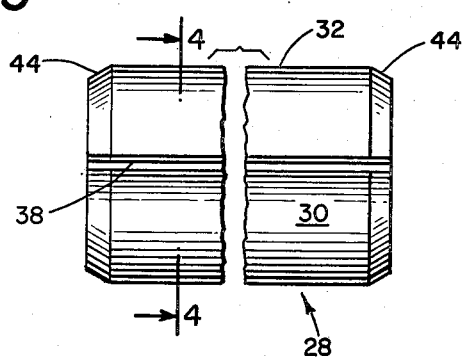
Fig. 3 is an elevation of a second pin embodying the invention.
Figure 4:
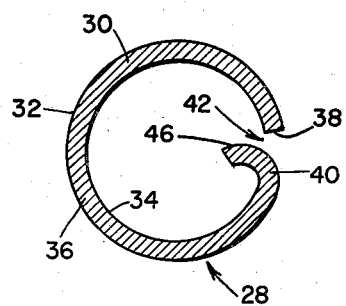
Fig. 4 is a sectional view on line 4—4 of Fig. 3.

Figs. 3 and 4 illustrate a second pin 28 which is similar to and possesses the same advantages as pin 8. Pin 28 has parts corresponding to the various parts of pin 8, including a body portion 30 of uniform wall thickness and outer and inner surfaces 32 and 34 respectively, a cylindrical part 36 which is C-shaped in sections perpendicular to the pin axis, and a longitudinal edge 38 joining surfaces 32 and 34 and terminating part 36. As shown, part 36 is of greater angular circumferential extent than cylindrical part 16 of pin 8, but again this is less than 360 degrees.

Body portion 30 has a longitudinal edge 38 joining surfaces 32 and 34 and terminating cylindrical part 36 and an additional part 40 which also terminates cylindrical part 36 circumferentially remote from edge 38 and extending from its location of merger with part 36 to a location closer to the pin axis than surface 34 at edge 38. Outer surface 32 in additional part 40 blends smoothly with outer surface 32 in part 36 and in part 40 confronts and is normally spaced from inner surface 34 at edge 38 to define therewith a longitudinal gap 42 the width of which is less than the wall thickness of body portion 30.

As shown, pin 28 also has at the ends thereof beveled portions 44 integral with body portion 30.

Additional part 40 is cylindrical, defining an additional axis parallel to the pin axis and between the pin axis and the location of merger of parts 36 and 40.

Body portion 30 has a further part 46 merging with part 40 and extending therefrom generally toward the pin axis. As shown, further part 46 is cylindrical and is a continuation of and has the same axis as additional part 40.

Figure 5:
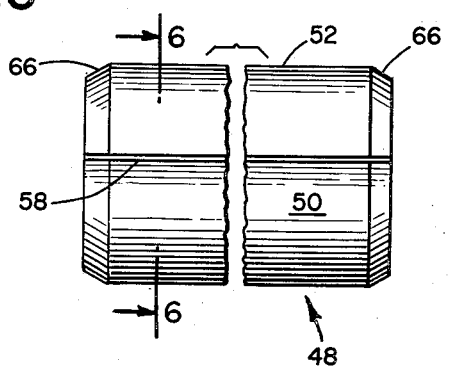
Fig. 5 is an elevation of a third pin embodying the invention.
Figure 6:
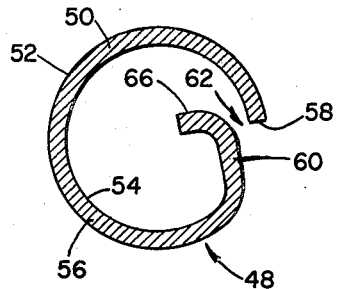
Fig. 6 is a sectional view on line 6—6 of Fig. 5.

Figs. 5 and 6 show a third pin 48 which is similar to and has the same advantages as pins 8 and 28. Pin 48 has parts corresponding to the various parts of pins 8 and 28, including a body portion 50 of uniform wall thickness and outer and inner surfaces 52 and 54, respectively, a cylindrical part 56 which is C-shaped in sections perpendicular to the pin axis, and a longitudinal edge 58 joining surfaces 52 and 54 and terminating part 56.

Body portion 50 has a longitudinal edge 58 joining surfaces 52 and 54 and terminating part 56 and an additional part 60 which also terminates cylindrical part 56 circumferentially remote from edge 58 and extending from its location of merger with part 56 to a location closer to the pin axis than surface 54 at edge 58. Outer surface 52 in additional part 60 blends smoothly with outer surface 52 in part 56 and in part 60 confronts and is normally spaced from inner surface 54 at edge 58 to define therewith a longitudinal gap 62 the width of which is less than the wall thickness of body portion 50.

Pin 48 as shown also has at the ends thereof beveled portions 66 integral with body portion 50.

Outer and inner surfaces 52 and 54 are planar in additional part 60.

Body portion 50 has a further part 66 merging with part 60 and extending therefrom generally toward the pin axis. As shown, surfaces 52 and 54 are planar in further part 66.

The differences among pins 8, 28 and 48 are partly a matter of choice but are largely the result of the dimensions and wall thickness of the pins involved. Thus, the nominal wall thicknesses and nominal normal outside diameters of pins 8, 28 and 48 are as follows:

| Pin | Wall Thickness, inches | Outside Diameter, inches |
| --- | --- | --- |
| 8 | 0.022 | 0.192 |
| 28 | 0.028 | 0.242 |
| 48 | 0.012 | 0.129 |

The disclosed examples of the invention are well adapted to the attainment of the objects and advantages set forth above and others.

Many changes in the details of the disclosed examples which will occur to those skilled in the art can be made without departing from the invention except as those details may be included in the appended claim.

What is claimed is:

A one-piece spring pin comprising a tube of resilient material defining a pin axis and having a body portion of uniform wall thickness and outer and inner surfaces and including a cylindrical part of C-shape in sections perpendicular to said axis and more than 270 degrees but less than 360 degrees in circumferential extent, said body portion having a longitudinal edge joining said outer and inner surfaces and terminating said cylindrical part, said body portion having an additional part also terminating said cylindrical part circumferentially remote from said edge and extending from its location of merger with said cylindrical part to an arcuate end portion generally between said axis and said longitudinal edge, said additional part disposed wholly within the outline of said cylindrical part so that the terminus of said end portion is substantially closer to said pin axis than said longitudinal edge, said outer surface in said additional part blending smoothly with said outer surface in said cylindrical part and confronting and normally spaced from said edge to define therewith a longitudinal gap the width of which is less than said thickness.

References Cited in the file of this patent

UNITED STATES PATENTS

| 722,814 | Conroy | Mar. 17, 1903 |
| 825,069 | Peirce | July 3, 1906 |
| 961,249 | Meeker | June 14, 1910 |

FOREIGN PATENTS

| 280,987 | Great Britain | Nov. 24, 1927 |
| 659,939 | Germany | May 17, 1938 |
| 155,021 | Australia | Feb. 3, 1954 |